Dec. 23, 1952 C. N. EDWARDS 2,622,941

BEARING WITH ONE END SUPPORT

Filed Feb. 14, 1949

Inventor

CHARLES N. EDWARDS

By [signature] Attorney

Patented Dec. 23, 1952 2,622,941

UNITED STATES PATENT OFFICE 2,622,941

BEARING WITH ONE END SUPPORT

Charles N. Edwards, Washington, D. C.

Application February 14, 1949, Serial No. 76,341

10 Claims. (Cl. 308—15)

(Granted under the act of March 3, 1883, as amended April 30, 1928; 370 O. G. 757)

This invention relates to spindles and bearings therefor, more particularly to specific types of spindles such as drive spindles for film reels in cameras.

The object of this invention broadly is to provide a sturdy bearing for a spindle or shaft which passes through and is to be supported in a thin wall, particularly where space restrictions prohibit the extension of the bearing on one side of the wall.

A further object is to provide a sturdy reel spindle support on a comparatively thin wall structure, where the spindle end has to be substantially flush against said wall and has a shaft passing through the wall accessible for driving from the other side of the wall by drive means which are substantially flush against said other side.

A further object is to improve the construction of film reel spindle support bearings for cameras and the like so as to obtain a more rigid structure without increasing the thickness of the supporting wall or the space between the base of the spindle and the other side of the supporting wall.

A further object is to provide a sleeve bearing for a spindle supported on a wall and having a shaft extending through said wall.

A further object is to strengthen the bearing support for a shaft on a thin wall through which the shaft passes and has a shoulder adjacent said wall, by extending the bearing into a cylindrical recess in said shoulder.

Other and more specific objects will appear in the following detailed description of some preferred forms of the invention as applied to film reel spindles for cameras and the like, having reference to the accompanying drawing, wherein.

Figure 5:
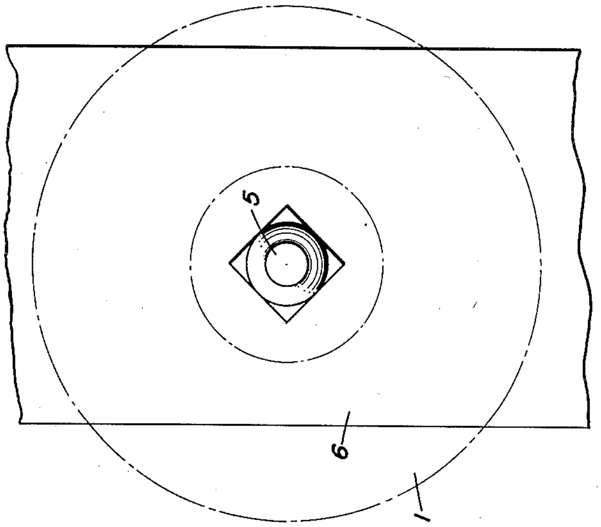
Fig. 5 is a plan view of one of the spindles showing a wall portion on which it is mounted, and the outline of a reel superimposed thereon in broken lines.
Figure 4:
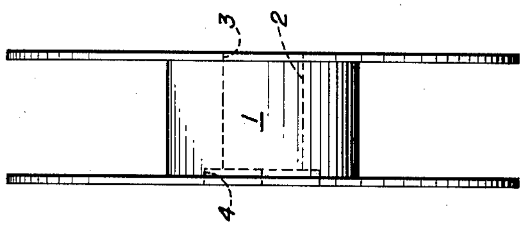
Fig. 4 is a side view of a film reel used in connection with the type of spindles illustrated.

The reel 1 has a central opening 2 which is round at one end 3 and square at the other end 4, the dimensions of the square end being the same as the diameter of the round end, and correspond to the shape of the corresponding ends of the spindle 5.

The spindle is mounted on a wall portion 6, and has a shaft 7 extending through the wall by means of which it may be driven from the other side of the wall. It will be noted that in each modification the base of the spindle is approximately flush against the wall, so that the reel when mounted thereon will be next to the wall with a close clearance, so as to reduce space requirements to a minimum. Any means may be used on the outside of the wall for driving the spindle with the least amount of projection from the wall by keeping the outer end of the bearing flush with the outer surface of the wall.

To increase the length and strength of the bearing, however, a sleeve 8 is extended into a corresponding cylindrical recess 9 in the spindle. This recess may extend from the base of the spindle around the shaft 7 through the major portion of the spindle.

Figure 1:
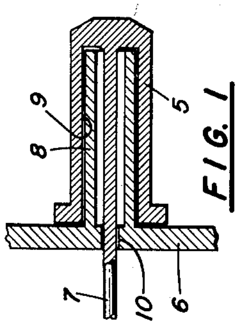
Fig. 1 is an axial sectional view of one form of construction of a spindle and bearing made in accordance with this invention.
Figure 2:
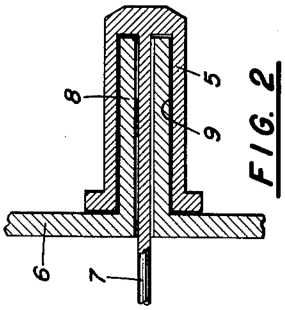
Figs. 2 and 3 are similar views of two modifications thereof.
Figure 3:
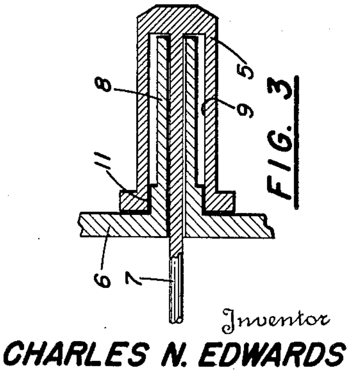

The bearing surfaces may extend throughout the length of the bearing externally of said sleeve as in Fig. 1, both externally and internally of said sleeve as in Fig. 2, or internally of said sleeve as in Fig. 3. In Fig. 1, additional bearing surface may be provided for the shaft through the wall as at 10, and in Fig. 3, additional bearing surface may be provided for the base of the spindle by an enlargement 11 at the base of the sleeve. Obviously needle roller bearings, ball bearings and lubrication means may be provided at these bearing surfaces where it may be desired. The sleeve 8 may be formed integral with the wall 6 or fixed rigidly thereto.

The resulting structure provides a sturdy precision spindle bearing support which gives smooth operation, and prevents rapid wear and loosening of the spindle with its consequent jamming due to binding of the reel against the walls of its enclosure.

Many obvious modifications may be made in the form and arrangement of parts without departing from the spirit and scope of the present invention as defined in the appended claims.

The invention described herein may be manufactured and used by or for the Government of the United States of America for governmental purposes without the payment of any royalties thereon or therefor.

What is claimed is:

1. In combination, a bearing sleeve, a supporting wall for said bearing sleeve, said bearing sleeve and wall having a continuous opening through the wall centrally of the bearing sleeve, a spindle having a shaft portion, a shoulder portion, and a portion connecting the shaft and shoulder portions, said shaft portion extending through the continuous opening and said shoulder portion being spaced from the shaft portion by an annular recess having sides formed by the shaft portion and the said connecting portion, said bearing sleeve being positioned within the recess and in bearing contact with at least one side of the recess, said shoulder portion bearing against the supporting wall and having a non-circular cross section in plan to thereby constitute a driving element adapted to drivingly connect with a driven member.

2. A spindle and bearing sleeve as defined in claim 1, wherein said bearing sleeve extends the major portion of the entire length of said spindle.

3. The combination of claim 1 further defined by said bearing sleeve having an external surface, and said surface cooperating with said one side of the recess to provide said bearing contact.

4. The combination of claim 1 further defined by said bearing sleeve having an internal surface, and said surface cooperating with said one side of the recess to provide said bearing contact.

5. In combination, a bearing sleeve, a supporting wall for said bearing sleeve, said bearing sleeve and wall having a continuous opening through the wall centrally of the bearing sleeve, a spindle having a shaft portion, a shoulder portion, and a portion connecting the shaft and shoulder portions, said shaft portion extending through the continuous opening and said shoulder portion being spaced from the shaft portion by an annular recess having sides formed by the shaft portion and the said connecting portion, said bearing sleeve having internal and external surfaces and being positioned within the recess with said surfaces in bearing contact with said recess sides, said shoulder portion bearing against the supporting wall and having a non-circular cross section in plan to thereby constitute a driving element adapted to drivingly connect with a driven member.

6. The combination of claim 1 further characterized in that the exterior portion of the spindle on the side of the wall from which the bearing sleeve extends is circular from the shoulder to the free end of the spindle for seating the driven element.

7. The combination of claim 1 further characterized in that the exterior portion of the spindle on the side of the wall from which the bearing sleeve extends is circular from the shoulder to the free end of the spindle for seating the driven element and that the shoulder is square with sides equal to a diameter of the said circular portion.

8. The combination of claim 1 further defined by said bearing sleeve being enlarged along a portion of its length to provide said external surface bearing contact.

9. In combination, a bearing sleeve, a supporting wall for said bearing sleeve, said bearing sleeve and wall having a continuous opening through the wall centrally of the bearing sleeve, a spindle having a shaft portion, a shoulder portion, and a portion connecting the shaft and shoulder portions, said shaft portion extending through the continuous opening and said shoulder portion being spaced from the shaft portion by an annular recess having sides formed by the shaft portions and the said connecting portion, said bearing sleeve being positioned within the recess and in bearing contact with the wall and only one side of the recess, said shoulder portion bearing against the supporting wall and having a non-circular cross section in plan to thereby constitute a driving element adapted to drivingly connect with a driven member.

10. In combination, a bearing sleeve, a supporting wall for said bearing sleeve, said bearing sleeve and wall having a continuous opening through the wall centrally of the bearing sleeve, a spindle having a shaft portion, a shoulder portion, and a portion connecting the shaft and shoulder portions, said shaft portion extending through the continuous opening and said shoulder portion being spaced from the shaft portion by an annular recess having sides formed by the shaft portion and the said connecting portion, said bearing sleeve being positioned within the recess and in bearing contact with at least one side of the recess, said shoulder portion bearing against the supporting wall and having a non-circular cross section, and a driven member having means forming a non-circular opening, the cross section of said opening being similar to that of the shoulder portion, said shoulder portion extending through said opening and being concentrically disposed therewith for rotating said member upon rotation of said shoulder portion.

CHARLES N. EDWARDS.

REFERENCES CITED

The following references are of record in the file of this patent:

UNITED STATES PATENTS

| Number | Name | Date |
|---|---|---|
| 24,106 | Camp | May 24, 1859 |
| 89,637 | Dayton | May 4, 1869 |
| 1,975,612 | Nystrom | Oct. 2, 1934 |
| 2,221,725 | Shipman | Nov. 12, 1940 |